United States Patent

[11] 3,628,173

| [72] | Inventor | Hans G. Danielmeyer<br>Matawan, N.J. |
|---|---|---|
| [21] | Appl. No. | 819,887 |
| [22] | Filed | Apr. 28, 1969 |
| [45] | Patented | Dec. 14, 1971 |
| [73] | Assignee | Bell Telephone Laboratories, Incorporated<br>Murray Hill, N.J. |

[54] LASER MODE SELECTION AND STABILIZATION APPARATUS EMPLOYING A BIREFRINGEMENT ETALON
5 Claims, 2 Drawing Figs.

[52] U.S. Cl. .................................................. 331/94.5, 250/199
[51] Int. Cl. .................................................. H01s 3/10
[50] Field of Search .................................................. 331/94.5; 250/199

[56] References Cited
UNITED STATES PATENTS
| 3,436,678 | 4/1969 | Sharp et al. ................... | 331/94.5 |
| 3,482,099 | 4/1965 | Goodwin ..................... | 250/199 |

*Primary Examiner*—Ronald L. Wibert
*Assistant Examiner*—R. J. Webster
*Attorneys*—R. J. Guenther and Arthur J. Torsiglieri ABSTRACT: There is disclosed a stabilized single-frequency arrangement for a broadband laser, such as a neodymium ion laser, in which a resonant etalon including birefringent material is disposed in the resonator in the path of the radiation and is tilted to select only one axial mode of oscillation in each of two orthogonal polarizations. In one specific embodiment, the resonator is tuned for maximum intensity of the mode of one polarization in response to a nearly linear intensity-frequency discriminant derived from the mode of the other polarization, which is provided with an operating point on a side of a transmission curve of the etalon.

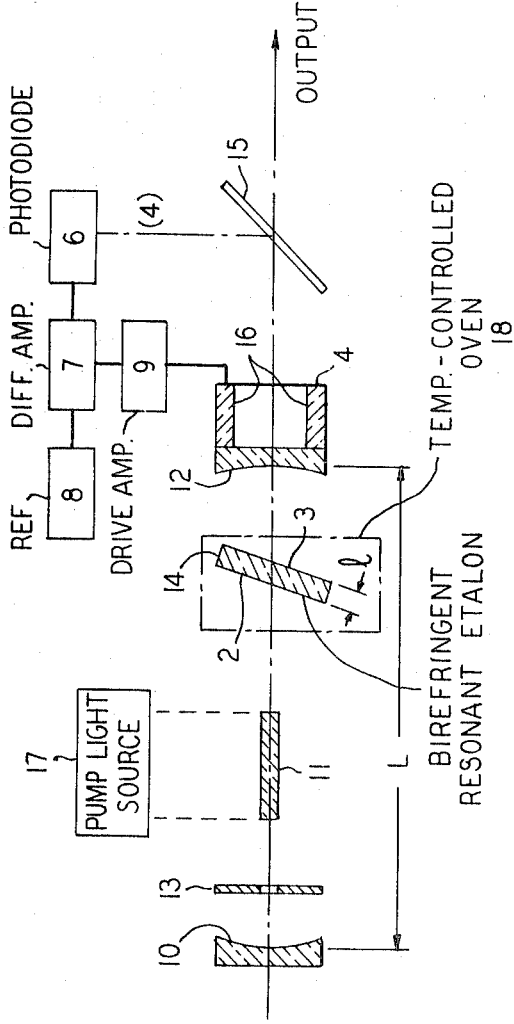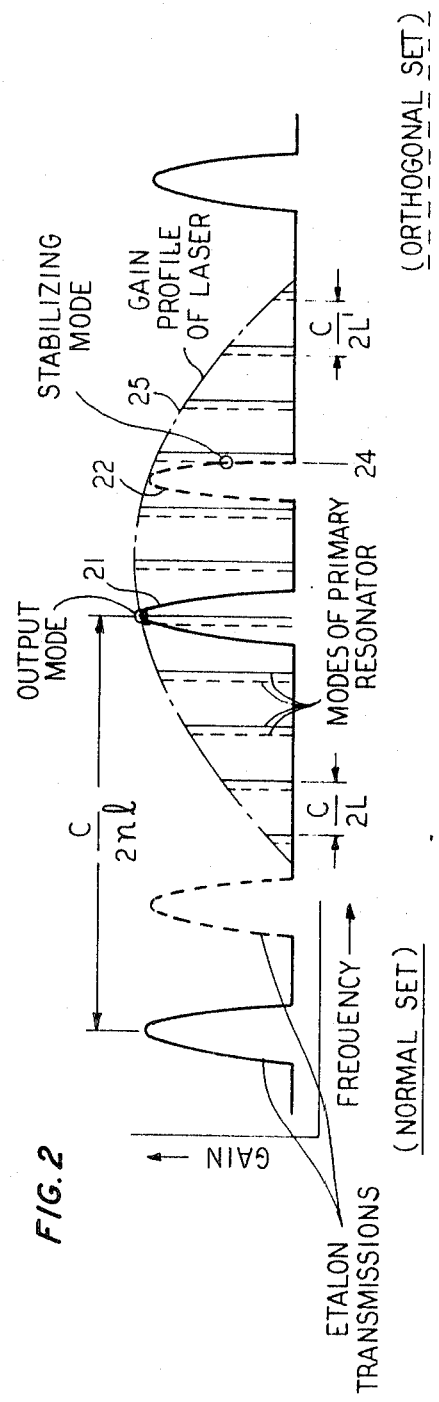

3,628,173

LASER MODE SELECTION AND STABILIZATION APPARATUS EMPLOYING A BIREFRINGEMENT ETALON

BACKGROUND OF THE INVENTION

This invention relates to mode selection and stabilization arrangements for broadband lasers, such as the solid-state lasers.

Many schemes have been developed to get single-frequency operation in helium-neon, argon ion, and neodymium ion solid-state lasers. In the case of the solid-state lasers such as the neodymium ion laser or the ruby laser, the apparent lack of effective mode competition and the very broadband of frequencies at which oscillations are obtained make that task difficult.

Some of the prior schemes employ auxiliary resonators having axes aligned with the axis of the primary resonator but being of very much smaller optical pathlength than the primary resonator. Such schemes fail to provide a sufficiently high degree of suppression of the unwanted modes because they are not directed out of the primary resonator. Other schemes have employed three-legged auxiliary resonators which do direct the unwanted modes out of the primary resonator but which are difficult to align and adjust and seldom provide a sufficiently large free spectral range to obtain single-frequency oscillation in the very broadband solid-state lasers. Free spectral range is the frequency separation between adjacent resonant axial modes of the auxiliary resonator.

Still other schemes employ a tilted resonant etalon of very small optical pathlength within the primary resonator, for example, as disclosed in the article by S. A. Collins et al. at page 1,291 in the book *Quantum Electronics III*, edited by Bloembergen (Grivet, 1964). Typically, a very low angle of tilt is required in order not to produce excessive loss for the selected axial mode. In order to implement a feedback control system to stabilize a single-frequency laser of this type, the laser frequency must be modulated to obtain an error signal, or the selected axial mode must be displaced in frequency somewhat from a frequency of peak transmission of the resonant etalon. These modifications degrade the overall performance of the system.

SUMMARY OF THE INVENTION

I have discovered a novel arrangement for providing stabilized single-frequency oscillation of very broadband solid-state lasers with relatively low loss and degradation of a selected resonant axial mode.

According to the principal feature of my invention, a stabilized single-frequency arrangement for a broadband laser employs a resonant etalon including birefringent material disposed in the resonator in the path of the radiation and tilted to select only one axial mode of oscillation in each of two orthogonal polarizations. Stabilization is achieved by external feedback which tunes the resonator to maximize the intensity of the selected mode in response to an intensity-frequency discriminant derived, at least in part, from the orthogonally polarized mode.

According to a feature of a preferred embodiment, the selected axial mode of one polarization is maximized in amplitude by the resonator tuning in response to a nearly linear intensity-frequency discriminant derived from the selected axial mode of the other polarization the intensity of which is typically much weaker than the intensity of the selected axial mode of the one polarization. Since very little power is contained in the relatively weak mode of the other polarization and since it is easily separated from the selected mode desired as an output, the losses attributable to the feedback control system are relatively small. The output powers of the two modes are in a solid-state laser quite independent of each other, so that the stabilizing mode's presence does not affect the power of the output mode. In other words, the linearly polarized output mode has as much power in the stabilized laser as it would have as an optimum in an unstabilized but otherwise similar single-frequency laser.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of a preferred embodiment of the invention; and FIG. 2 shows curves which are useful in explaining the operation of the invention.

DESCRIPTION OF ILLUSTRATIVE EMBODIMENT

In the preferred embodiment of the invention shown in FIG. 1 a broadband solid-state laser includes the active medium 11 in the form of a crystalline rod of solid material including the lasing atoms. Illustratively, the crystalline rod is an yttrium-aluminum-garnet rod; and the lasing atoms are neodymium ions contained in the lattice of the yttrium-aluminum-garnet. The active medium 11 typically has antireflection-coated end surfaces, so that an external optical resonator comprising the opposed reflectors 10 and 12 may be provided. An apertured plate 13 is illustratively provided in order to ensure operation in a single transverse mode; and the tilted birefringent resonant etalon 14 is oriented and adapted to provide oscillation in only one axial mode in each of two orthogonal polarizations. One of the polarizations is illustratively in the plane of the angle of tilt of etalon 14 and the other polarization is orthogonal thereto (orthogonal to the paper).

The reflector 12 is made partially transmissive in the oscillation band, illustratively about 1.06 micrometers.

An external feedback control system is provided to move reflector 12 axially to tune the laser resonator in accordance with my invention.

While the illustrative embodiment of FIG. 1 will demonstrate the usefulness of this arrangement for the very broadband solid-state lasers, it should also be clear from the following description that this arrangement will have general usefulness for all lasers.

The feedback system is implemented as follows. The selected mode of polarization, illustratively in the plane of the paper, is partially transmitted through reflector 12; and the transmitted portion is substantially completely transmitted by the beam splitter 15 which is tilted at an angle to the resonator axis in the plane in which the selected mode is polarized. Illustratively, the beam splitter 15 is a dielectric plate disposed at Brewster's angle for the selected mode so that a negligible portion of the selected mode is directed toward photodiode 6. For some applications, the beam splitter 15 may be a polarizer or a Glan-Thompson prism. The relatively weak mode of orthogonal polarization is predominantly reflected from beam splitter 15 to photodiode 6. The output of the photodiode is compared with a reference voltage from a reference voltage source 8 by a conventional difference amplifier 7. The output of difference amplifier 7 is amplified in the drive amplifier 9 and applied to piezoelectric crystal 16 to move reflector 12 axially in a sense that will reduce the deviation between the output signal of photodiode 6 and the reference voltage source 8. It therefore will be seen that the reference voltage is chosen to correspond to the output signal of photodiode 6 for maximum amplitude of the selected mode.

The elation 14 includes a thin plate of a birefringent material such as quartz, calcite or lithium niobate with highly flat parallel major surfaces 2 and 3 cut parallel to the optic axis of the material and also includes surface coatings (not separately labeled) to obtain suitable equal reflectivities for the laser radiation sufficient to obtain effective selection of just one axial mode of oscillation. Its thickness, $b$, is chosen so that the free spectral range is greater than one-half the width of the gain versus frequency profile for the laser for which oscillation can be obtained with appropriate tuning. Since, preferably, reflector 12 has a substantially larger radius of curvature than reflector 10, the etalon is inserted into the laser resonator close to the beam waist which will occur relatively near to reflector 12. Because of the flat surfaces of etalon 14, it is desired that the laser radiation have substantially planar wave fronts therein.

Illustratively, etalon 14 is tilted by 6 minutes of arc to direct out of the primary resonator the unwanted axial modes which are reflected off surfaces 2 and 3 of the etalon. The temperature of etalon 14 is controlled by the variable temperature oven 18 to tune the transmission peak frequencies of the etalon obtaining (1) desired positions with respect to the gain curve and (2) a desired spacing between the selected orthogonal polarizations with respect to the axial mode spacings of the primary resonator. The pumping power from pumping light source 17 is preferably highly stabilized (by means not shown).

The operation of the invention may be understood more easily with reference to the curves of FIG. 2. Curve 25 represents the gain versus frequency profile of the laser for which oscillations can be obtained with appropriate tuning. The more steeply sloped curves or pips such as those labeled 21 and 22 represent the transmissions of the etalon 14. The solid line pips represent the characteristics for the polarization in the plane of the paper, termed the normal set of modes; and the dashed curves such as pip 22 represent the transmission characteristics of the etalon for the orthogonally polarized set of modes. The corresponding resonances of the primary resonator, taking into account the differences in optical pathlength in etalon 14, are shown by vertical solid lines for the set of modes polarized in the plane of the paper and by vertical dashed lines for the modes polarized orthogonal thereto.

The free spectral range referred to above is $c/2nl$, where $c$ is velocity of light and $n$ is the pertinent index of refraction in the birefringent material. This free spectral range is indicated in the curves of FIG. 2 and is somewhat different for the two polarizations of radiation, although this difference does not greatly affect the spacing of the modes resonant in both the primary and auxiliary resonators, as shown in the drawing. The desired separation of the etalon transmissions for the orthogonal polarizations are obtained by virtue of the fact that the optical pathlengths for the ordinary and extraordinary polarizations in etalon 14 change with temperature at different rates. It is, therefore, possible to adjust the temperature of the etalon to obtain the separation of the etalon transmissions for the normal set of modes and the orthogonally polarized set of modes as shown in FIG. 2.

Note that the essential result of this temperature adjustment is the following, as shown in FIG. 2; one transmission peak of the etalon, the peak of pip 21, coincides with the corresponding axial mode of the primary laser resonator close to the center of the gain profile 25. On the other hand, the transmission peak of the etalon for the selected mode of orthogonal polarization, the peak of pip 22, does not coincide with the corresponding resonant mode of the primary resonator of the laser. Rather, the primary resonator mode intercepts the transmission characteristic of the etalon on a nearly linear, in the sense of being linear for very small incremental changes, portion of the side of pip 22. The intercept point is circled and indicated as the operating point of the stabilizing mode.

It will be apparent that a small frequency variation of the resonant modes of the primary resonator relative to the etalon transmission peaks will yield an intensity variation of the stabilizing mode which is nearly linearly related to the frequency variation. This variation of the stabilizing mode is easily detected in spite of the relatively small variation in amplitude of the orthogonally polarized output mode because the orthogonally polarized modes are readily separated at beam splitter 15. The variation of the stabilizing mode is detected by photodiode 6 and, by comparison with the constant reference from source 8, produces an error signal from difference amplifier 7 and drive amplifier 9 to drive piezoelectric crystal 16 and reflector 12 in a sense to reduce the error signal.

Thus, the output mode is stabilized in amplitude and frequency without any direct detection of its relatively small variations. Note that the frequency stability of the output mode equals that of the stabilizing mode; and the amplitude stability of the output mode is much better than that of the stabilizing mode since the output frequency occurs near the relatively flat top portion of the etalon's transmission peak.

In a slightly modified embodiment which has actually been successfully operated, the etalon 14 had 52 percent transmissivity coatings on surfaces 2 and 3. Reflector 10 had a 3 meter radius of curvature; and reflector 12 had a 10 meter radius of curvature. Reflectors 10 and 12 were spaced at a separation of 12 cm., which was about four times the length of the laser rod. The thickness, $l$, of the differentiator etalon 14 was about 0.2 cm. and its angle of tilt was 6 minutes. Because of the lack of a suitable direct-current drive amplifier 9, the laser beam was chopped by a 510 Hz. chopper which synchronized a lock-in amplifier responsive to photodiode 6. The output of the lock-in amplifier was applied to a high voltage AC amplifier of conventional type for driving the piezoelectric crystal 16. The iris 13 was set for $TEM_{00x}$.

The lock-in amplifier was set to 50 millivolts sensitivity, 90° phase (determined by the 510 Hz. chopper), and either a 10 second or a 10 millisecond time constant. The lock-in amplifier was also provided with an output offset which provided the equivalent of the reference voltage from reference voltage source 8. In other words, the output offset just canceled the direct-current signal generated from the stabilizing mode if it had the proper amplitude to maximize the amplitude of the output mode. For a quartz etalon 14 the proper mode selection characteristics were found at $330.87 \pm .01$ °K. etalon temperature.

The maximum power fluctuation of the output mode was $\pm 5$ percent; and the maximum frequency fluctuation was 15 MHz as observed on an oscilloscope responding to a detector employing a recording Fabry-Perot interferometer having 300 MHz line width at a 1 cm. interferometer spacing. The time of unattended operation was about 1 hours in the initial experiment. It was found that once the system is made operational, the error signal is strong enough to offset the maximum possible manual misalignment of the primary resonator, which is about $\pm$ eight tenths of a wavelength at 1.06 micrometers. The system worked as well for higher order transfer modes and, in that case, supplied more output power.

There are a number of possible modifications of the illustrative embodiment of FIG. 1. For example, in the case in which amplitude fluctuations of the laser occur for reasons other than frequency stability and might erroneously simulate frequency variations, a compensating effect can be obtained by generating the reference voltage from a fraction of the output mode. This modification is based on the assumption that the amplitude fluctuations affect the output mode and the stabilizing mode proportionally.

Another modification would employ a length modulation of the primary resonator in the frequency range of about 100 Hz. to obtain a small amplitude modulation of the output mode. This modulation may be phase sensitive detected to obtain an error signal which keeps the operating point of the output mode at the peak of the etalon transmission 21. In this event, the orthogonally polarized mode may be as strong as the previously selected output mode. This result would be achieved by changing the etalon temperature so that the peak of each pip coincides with an axial mode of proper polarization. The frequency separation of the orthogonally polarized powerful output modes can be as wide as the gain profile 25 and the stability of the frequency separation is determined only by the difference of the temperature coefficients of the optical lengths. This modified embodiment is attractive as a source of collinear beams for use in heterodyning, the advantage being that they are obtained from only one laser.

Other modifications are possible. For example, the transmission peaks for the orthogonally polarized modes can be made to coincide, in which case the etalon 14 no longer appears birefringent for the light of the desired output frequency.

In still another modification the etalon transmission peaks for the orthogonally polarized modes are adjusted, by etalon temperature adjustment, so that their separation is just a little greater or smaller than the separation of the two orthogonally polarized oscillating laser modes. Both of these modes will then be strong in amplitude; but a resonator length deviation affects the amplitudes in opposite senses. The difference of their amplitudes therefore provides the frequency discriminant for driving the piezoelectric crystal 16.

It should in addition be noted that in modified embodiments in which the etalon is of a material, such as lithium niobate, which is phase-matchable for second harmonic generation from the output mode, that the illustrative embodiment simultaneously acts as an efficient harmonic generator. Preferably the coatings on surfaces 2 and 3 of etalon 14 are then made highly transparent at the second harmonic frequency even though they are reflective at the frequency of the fundamental output mode. Moreover, the intensity buildup of the electric field of the fundamental output mode inside etalon 14 helps make the harmonic generation more efficient.

In this case, an additional modification is made possible in that the stabilization may be accomplished with a fraction of the second harmonic light or with a small amount of the fundamental light of the selected mode, which is no longer itself the desired output.

A more fundamental modification of the invention eliminates the need for tilting the birefringent resonant etalon by coating it with a very thin metallic film which is effective to absorb the nonselected modes instead of directing them out of the resonator. In other respects, its operation is similar to that described above. The same types of stabilizing operation are possible.

It should be noted that the birefringent resonant etalon could include a second thin plate of another material cut to compensate the changes of optical pathlength with temperature, if better stability in the presence of temperature disturbances is desired.

I claim:

1. Apparatus for generating frequency-controlled coherent electromagnetic radiation comprising:
   a laser having an optical resonator and an active medium capable of the stimulated emission or radiation in a plurality of axial modes in each of two orthogonal polarizations,
   a resonant etalon including birefringent material disposed in said resonator in the path of said radiation and tilted to select only one axial mode of oscillation in each of said orthogonal polarizations,
   feedback means responsive to variations in intensity of the radiation in at least one of said modes in one polarization to tune said resonator to stabilize the frequency of the radiation in the other of said modes in the orthogonal polarization, and
   means for tuning the etalon to move the sets of modes in frequency for the two orthogonal polarizations with respect to the gain curve and with respect to each other to obtain a desired operating point and a desired intensity versus frequency discriminant for the feedback means.

2. Apparatus for generating frequency-controlled coherent electromagnetic radiation comprising:
   a laser having an optical resonator and an active medium capable of the stimulated emission of radiation in a plurality of axial modes in each of two orthogonal polarizations,
   a resonant etalon including birefringent material disposed in said resonator in the path of said radiation and tilted to select only one axial mode of oscillation in each of said orthogonal polarizations,
   feedback means including means for separating the selected modes of orthogonal polarization, means for detecting the intensity of one of said modes on one polarization and comparing it to a reference level, and means responsive to the detecting and comparing means for changing the optical pathlength of the optical resonator to reduce the deviation of the detected intensity from the reference level, and
   means for tuning the etalon to move the sets of modes in frequency for the two orthogonal polarizations with respect to the gain curve and with respect to each other to obtain a desired operating point and a desired intensity versus frequency discriminant for the feedback means.

3. Apparatus for generating frequency-controlled coherent electromagnetic radiation comprising
   a laser having an optical resonator and an active medium capable of the stimulated emission of radiation in a plurality of axial modes in each of two orthogonal polarizations,
   a resonant etalon including birefringent material disposed in said resonator in the path of said radiation and tilted to select only one axial mode of oscillation in each of said orthogonal polarizations,
   feedback means including means for separating the selected modes of orthogonal polarizations, means for detecting the intensity of one of said modes on one polarization and comparing it to a reference level, and means responsive to the detecting and comparing means for changing the optical pathlength of the optical resonator to reduce the deviation of the detected intensity from the reference level, and
   means for controlling the temperature of the etalon to provide that the detected mode has an operating point on a nearly linear side region of a transmission-versus-frequency curve of said etalon, whereby a nearly linear intensity-versus-frequency discriminant is obtained at the output of the detecting and comparing means.

4. Apparatus according to claim 1 in which said means for tuning the etalon comprises means for controlling the temperature of the etalon, whereby the optical path lengths and consequently the sets of modes for each of said orthogonal polarizations in the etalon change with temperature at different rates.

5. Apparatus according to claim 2 in which said means for tuning the etalon comprises means for controlling the temperature of the etalon, whereby the optical path lengths and consequently the sets of modes for each of said orthogonal polarizations in the etalon change with temperature at different rates.

* * * * *